US012809099B2

(12) United States Patent
Haase

(10) Patent No.: US 12,809,099 B2
(45) Date of Patent: Nov. 24, 2026

(54) LATCHING COVER FOR AN OPTICAL CONNECTOR

(71) Applicant: 3M INNOVATIVE PROPERTIES COMPANY, St. Paul, MN (US)

(72) Inventor: Michael A. Haase, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 338 days.

(21) Appl. No.: 18/717,093

(22) PCT Filed: Dec. 12, 2022

(86) PCT No.: PCT/IB2022/062085
§ 371 (c)(1),
(2) Date: Jun. 6, 2024

(87) PCT Pub. No.: WO2023/111825
PCT Pub. Date: Jun. 22, 2023

(65) Prior Publication Data

US 2025/0044531 A1 Feb. 6, 2025

Related U.S. Application Data

(60) Provisional application No. 63/291,053, filed on Dec. 17, 2021.

(51) Int. Cl.
*G02B 6/38* (2006.01)

(52) U.S. Cl.
CPC ............. *G02B 6/389* (2013.01); *G02B 6/381* (2013.01); *G02B 6/3826* (2013.01); *G02B 6/3893* (2013.01); *G02B 6/3829* (2013.01)

(58) Field of Classification Search
CPC .... G02B 6/3807; G02B 6/381; G02B 6/3818; G02B 6/3826; G02B 6/3829; G02B 6/389; G02B 6/3893
See application file for complete search history.

(56) References Cited

U.S. PATENT DOCUMENTS 5,647,042 A * 7/1997 Ochiai ................ G02B 6/4292 385/60
6,632,023 B1 * 10/2003 Ogawa ................ G02B 6/4285 439/453

(Continued)

FOREIGN PATENT DOCUMENTS

KR 10-2018-0115577 A * 10/2018
WO 2020202010 A1 10/2020

OTHER PUBLICATIONS

International Search report for PCT International Application No. PCT/IB2022/062085, mailed on Feb. 15, 2023, 5 pages.

(Continued)

*Primary Examiner* — Michael Stahl
(74) *Attorney, Agent, or Firm* — Jonathan L. Tolstedt

(57) ABSTRACT

A covering latch configured to secure an optical ferrule received in an optical cradle including a cover portion configured to extend across and cover at least a portion of the optical ferrule, a pair of rear arms and an opposing elastic front arm extending downwardly from proximate respective rear and front ends of the cover portion for engaging respective rear and front sides of the optical cradle. The pair of rear arms define an opening therebetween for receiving an optical waveguide attached to the optical ferrule, such that pulling the cover portion rearwardly, causes the elastic front arm to flex, and the rear arms to disengage from the rear side of the optical cradle.

20 Claims, 9 Drawing Sheets

(56) References Cited

U.S. PATENT DOCUMENTS

| | | | | |
|---|---|---|---|---|
| 2007/0177844 | A1* | 8/2007 | Nagasaka | G02B 6/4249 385/94 |
| 2012/0027345 | A1* | 2/2012 | Castagna | G02B 6/4292 385/33 |
| 2012/0148202 | A1 | 6/2012 | Banal, Jr. et al. | |
| 2013/0216190 | A1 | 8/2013 | Haley et al. | |
| 2013/0343698 | A1* | 12/2013 | Ko | G02B 6/4257 385/14 |
| 2016/0091670 | A1* | 3/2016 | Akieda | G02B 6/4284 385/78 |
| 2016/0320568 | A1 | 11/2016 | Haase et al. | |
| 2017/0227718 | A1* | 8/2017 | Akieda | G02B 6/3897 |
| 2017/0363829 | A1* | 12/2017 | Lee | G02B 6/3885 |
| 2018/0321450 | A1* | 11/2018 | Rosenberg | G02B 6/36 |
| 2019/0094471 | A1 | 3/2019 | Haase et al. | |
| 2020/0012056 | A1* | 1/2020 | Lian | G02B 6/3893 |
| 2020/0326495 | A1* | 10/2020 | Liao | G02B 6/426 |
| 2021/0103098 | A1 | 4/2021 | Haase et al. | |
| 2021/0103106 | A1 | 4/2021 | Haase et al. | |
| 2021/0199905 | A1 | 7/2021 | Cai et al. | |
| 2021/0247574 | A1 | 8/2021 | Haase | |
| 2022/0146761 | A1 | 5/2022 | Haase et al. | |
| 2022/0229242 | A1 | 7/2022 | Haase et al. | |
| 2022/0404569 | A1 | 12/2022 | Haase et al. | |
| 2023/0168439 | A1 | 6/2023 | Haase | |
| 2024/0201453 | A1 | 6/2024 | Haase et al. | |

OTHER PUBLICATIONS

Product image for Prizm® Expanded Beam Ferrules and Components, retrieved from internet on Aug. 8, 2024 (date unknown but believed to be prior to the date of the filing of the present application), URL<http://www.usconec.com/products/ferrules/prizm-lightturn_ferrule.htm>, 4 Pages.

* cited by examiner

LATCHING COVER FOR AN OPTICAL CONNECTOR

REFERENCE TO RELATED APPLICATIONS

This application is a national stage filing under 35 U.S.C. 371 of PCT/IB2022/062085, filed Dec. 12, 2022, which claims the benefit of U.S. Provisional Application No. 63/291,053, filed Dec. 17, 2021, the disclosures of which are incorporated by reference in their entireties herein.

SUMMARY

In some aspects of the present description, a covering latch is provided, the covering latch configured to secure an optical ferrule received in an optical cradle. The covering latch includes a cover portion configured to extend across and cover at least a portion of the optical ferrule, a pair of rear arms, and an opposing elastic front arm extending downwardly from proximate respective rear and front ends of the cover portion for engaging respective rear and front sides of the optical cradle. The pair of rear arms define an opening therebetween for receiving an optical waveguide attached to the optical ferrule. Pulling the cover portion rearwardly causes the elastic front arm to flex and the rear arms to disengage from the rear side of the optical cradle.

In some aspects of the present description, a unitary covering latch is provided, the unitary covering latch configured to be removably assembled to an optical cradle configured to align an optical ferrule. The covering latch includes a middle portion, at least one rear-engaging feature, and at least one front-engaging feature spaced apart along a length direction of the covering latch and disposed at respective rear and front sides of the covering latch. When the unitary covering latch is removably assembled to the optical cradle aligned to the optical ferrule: the middle portion covers at least a portion of the optical ferrule, the at least one rear-engaging feature engages a rear side of the optical cradle, and the at least one front-engaging feature engages a front side of the optical cradle. The covering latch secures the optical ferrule aligned to the optical cradle and the unitary covering latch is removed from the optical cradle by first pulling the unitary covering latch rearwardly along the length direction followed by rotating the unitary covering latch about a lateral axis substantially orthogonal to the length direction and disposed near the front side of the covering latch.

DETAILED DESCRIPTION

Figure 1:
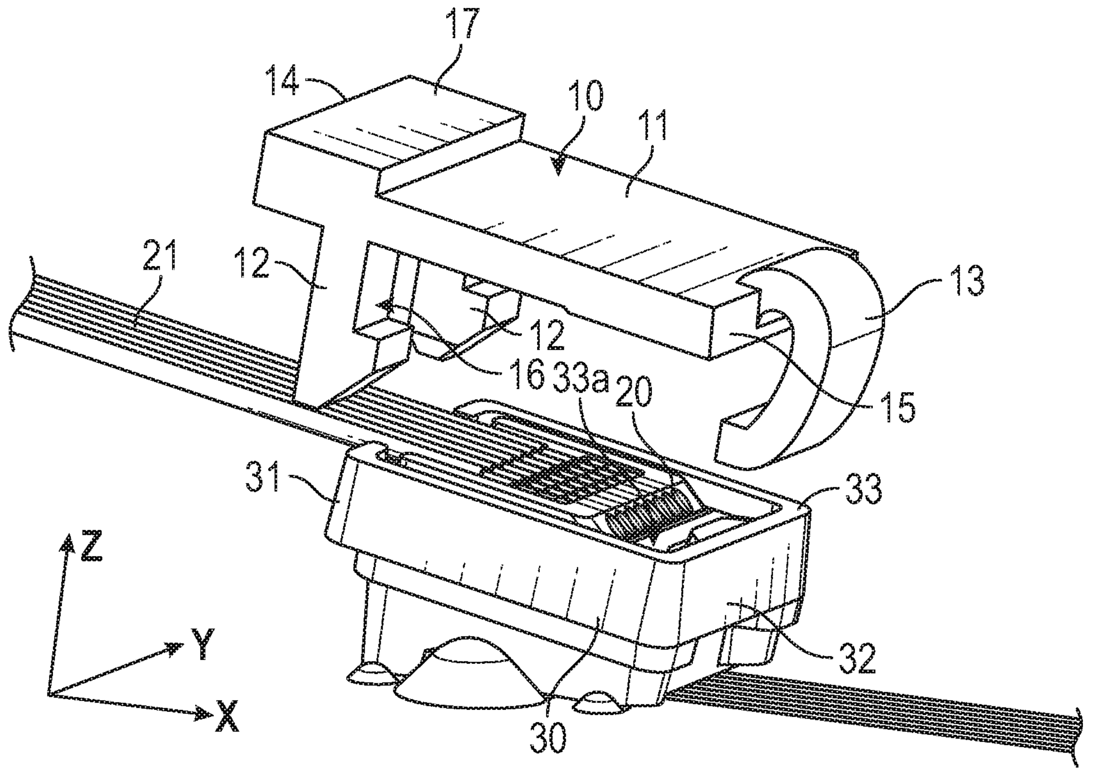
FIG. 1 is a perspective view of a covering latch configured to secure an optical ferrule received in an optical cradle in an unlatched position, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

As data rates in computers continue to rise, copper conductors become increasingly unable to transport this highspeed data between components at the speeds the customers demand. Silicon photonics helps ease this bottleneck by enabling data transport through optical fiber rather than copper traces. Efficient coupling of light between optical fibers and small-core photonic integrated circuit waveguides is a well-known problem. Existing solutions involve active alignment and permanent attachment of the fibers which is expensive, slow, often high loss and incompatible with solder reflow of the photonics integrated circuit. One solution to this is a pluggable ceramic connector interface for silicon photonics transceivers, including a ceramic "cradle" component bonded to the photonics integrated circuit, and an optical ferrule that would be received in and mate to the cradle.

According to some aspects of the present description, a covering latch as a means to reversibly secure the ferrule in the cradle and ensure optical alignment between an optical waveguide attached to the ferrule and an optical component on a substrate is provided. In some embodiments, a covering latch is configured to secure an optical ferrule received in an optical cradle. In some embodiments, the covering latch includes a cover portion configured to extend across and cover at least a portion of the optical ferrule, a pair of rear arms, and an opposing elastic front arm extending downwardly from proximate respective rear and front ends of the cover portion for engaging respective rear and front sides of the optical cradle. In some embodiments, the pair of rear arms may define an opening therebetween for receiving an optical waveguide attached to the optical ferrule. In some embodiments, pulling the cover portion rearwardly causes the elastic front arm to flex and the rear arms to disengage from the rear side of the optical cradle. In some embodiments, in a top plan view of the covering latch, the covering latch may extend across and cover at least 30%, or at least 40%, or at least 50% of the optical ferrule.

In some embodiments, at least one of the rear arms in the pair of rear arms may include a rear latch hook disposed proximate a free end of the rear arm for engaging a rear latching surface defined in the rear side of the optical cradle. In some embodiments, the rear latching surface may be spaced apart from top and bottom major surfaces of the optical cradle along a thickness direction (e.g., the z-axis of the cradle, such as the z-axis shown in FIG. 1) of the optical cradle. In such embodiments, the rear latching surface may face the bottom, and away from the top, major surface. In some embodiments, the top major surface may have an opening (e.g., a recess or a pocket) therein for receiving the optical cradle.

In some embodiments of the covering latch, the elastic front arm may include a front latch hook disposed proximate a free end of the front arm for engaging a front latching surface defined in the front side of the optical cradle. In such embodiments, the front latching surface may be spaced apart from the top and bottom major surfaces of the optical cradle along a thickness direction (e.g., the z-axis) of the optical cradle. In such embodiments, the front latching surface may face the bottom, and away from the top, major surface.

In some embodiments, the elastic front arm may be substantially more elastically flexible than each of the pair of rear arms. In some embodiments, the elastic front arm may be generally C-shaped and each of the pair of rear arms may be generally L-shaped. In some embodiments, the covering latch may further include a pull portion extending rearwardly from the rear end of the cover portion which may be configured to be pulled rearwardly and/or upwardly to cause the elastic front arm to flex and the rear arms to disengage from the rear side of the optical cradle.

In some embodiments, a width of the covering latch as seen from the rear side of the covering latch may not be significantly wider than a width of the optical cradle (i.e., the width of the covering latch may be less than or equal to the width of the optical cradle), allowing two covering latches to be disposed in close proximity to each other in a side-by-side position.

In some embodiments, a width of the elastic front arm as seen in a top plan view of the covering latch may be less than a width of the opening defined between the pair of rear arms, allowing two covering latches to be disposed close to each other in an end-to-end configuration. In such configurations, the elastic front arm of a first covering latch will not interfere with the rear arms of a second covering latch when the rear arms of the second covering latch are pulled rearwardly toward the elastic front arm of the first covering latch.

According to some aspects of the present description, a unitary covering latch may be configured to be removably assembled to an optical cradle configured to align to an optical ferrule. In some embodiments, the covering latch may include a middle portion, at least one rear-engaging feature, and at least one front-engaging feature spaced apart along a length direction (e.g., the x-axis as shown in FIG. 1) of the covering latch and disposed at respective rear and front sides of the covering latch. In some embodiments, when the unitary covering latch is removably assembled to the optical cradle aligned to the optical ferrule: the middle portion may cover at least a portion of the optical ferrule, the at least one rear-engaging feature may engage a rear side of the optical cradle, and the at least one front-engaging feature may engage a front side of the optical cradle. In some embodiments, the covering latch may secure the optical ferrule aligned to the optical cradle and the unitary covering latch may be removed from the optical cradle by first pulling the unitary covering latch rearwardly along the length direction followed by rotating the unitary covering latch about a lateral axis substantially orthogonal to the length direction and disposed near the front side of the covering latch. In some embodiments, a top major surface of the optical cradle may define an opening therein for receiving the optical ferrule.

In some embodiments, the unitary covering latch may be configured such that the optical ferrule aligned to the optical cradle remains secure when an external force acts on an optical waveguide (e.g., one or more optical fibers) attached to the optical ferrule (e.g., the optical waveguide is pulled in a direction which would otherwise cause the optical ferrule to be dislodged from or misaligned to the optical cradle).

In some embodiments, the at least one rear-engaging feature may include a rear latch hook disposed proximate a free end of the at least one rear-engaging feature for engaging a rear latching surface defined in the rear side of the optical cradle. In some embodiments, the rear latching surface may be spaced apart from opposing top and bottom major surfaces of the optical cradle along a thickness direction (e.g., the z-axis) of the optical cradle. In some embodiments, the top major surface of the optical cradle may define an opening (e.g., a recess or a pocket) therein for receiving the optical ferrule.

In some embodiments, the at least one front-engaging feature may include a front latch hook disposed proximate a free end of the at least one front-engaging feature for engaging a front latching surface defined in the front side of the optical cradle. In such embodiments, the front latching surface may be spaced apart from top and bottom major surfaces of the optical cradle along a thickness direction (e.g., the z-axis) of the optical cradle. In some embodiments, the at least one front-engaging feature may be substantially more elastically flexible than the at least one rear-engaging feature. In some embodiments, the at least one front-engaging feature may be generally C-shaped and the at least one rear-engaging feature may be generally L-shaped.

In some embodiments, the unitary covering latch may further include a pull portion extending rearwardly and/or upwardly from the rear side of the middle portion, which may be configured to be pulled rearwardly to cause the at least one front-engaging feature to flex and the at least one rear-engaging feature to disengage from the rear side of the optical cradle.

Turning now to the figures. FIG. 1 is a perspective view of a unitary covering latch (or simply "covering latch") for an optical assembly in an unlatched position, according to an embodiment of the present description. In some embodiments, covering latch 10 may be configured to secure an optical ferrule 20 received in an opening 33*a* in a top major surface 33 of an optical cradle 30. The covering latch 10 may include a cover portion 11 configured to extend across and cover at least a portion of optical ferrule 20 when in its final latched position (see, for example, FIG. 2). In some embodiments, from a top plan view of the covering latch 10, the covering latch 10 may extend across and cover at least 30%, or at least 40%, or at least 50% of the optical ferrule 30.

In some embodiments, covering latch 10 further includes a rear-engaging feature (e.g., a pair of rear arms 12) and an opposing front engaging feature (e.g., an elastic front arm 13) extending downwardly (i.e., in the negative direction of the z-axis as shown in FIG. 1) from proximate respective rear 14 and front 15 ends of the cover portion 11 for engaging respective rear 31 and front 32 sides of the optical cradle 30. In some embodiments, the pair of rear arms 12 may define an opening 16 therebetween for receiving an optical waveguide 21 (e.g., one or more optical fibers) attached to the optical ferrule 20. In some embodiments, elastic front arm 13 may be generally C-shaped, and each of the pair of rear arms 12 may be generally L-shaped.

In some embodiments, when the covering latch 10 is in the latched position (see, for example, FIG. 2), pulling the cover portion 11 rearwardly causes the elastic front arm 13 to flex, and the rear arms 12 to disengage from the rear side 31 of the optical cradle 30. In some embodiments, the elastic front arm 13 may be substantially more elastically flexible than each of the pair of rear arms 12 (i.e., configured to flex enough to disengage the rear arms 12 from optical cradle 30). In some embodiments, covering latch 10 may further include a pull portion 17 extending rearwardly and/or upwardly from the rear end 14 of the cover portion 11 and may be configured to be pulled rearwardly to cause the elastic front arm 13 to flex and the rear arms 12 to disengage from the rear side 31 of the optical cradle 30.

Figure 2:
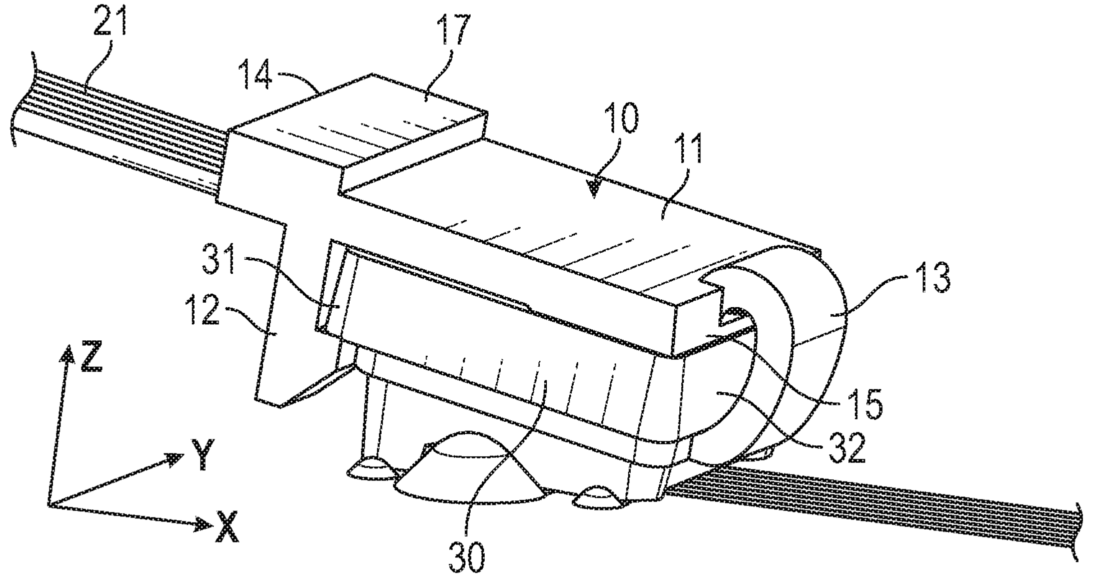
FIG. 2 is a perspective view of a covering latch configured to secure an optical ferrule received in an optical cradle in a latched position, in accordance with an embodiment of the present description.

FIG. 2 is an alternate perspective view of the covering latch 10 from FIG. 1 shown in a latched position (i.e., the latch 10 pressed down over and engaged with optical cradle 30 and covering optical ferrule 20 and holding it engaged with and in alignment with optical cradle 30). The elements of FIG. 2 serve the same function as like-numbered elements of FIG. 1 unless otherwise noted, and thus additional description may not be provided for these elements in the discussion of FIG. 2. This same statement applies to all other figures described herein. That is, an element common to two or more different figures will be assumed to serve the same function as its like-numbered element in other figures herein, unless specifically described otherwise. The main intent of the alternate view of FIG. 2 is to show covering latch 10 fully engaged with cradle 30, with elastic front arm engaging front side 32 of optical cradle 30 and rear arms 12 engaged with rear side 31 of optical cradle 30.

Figure 3:
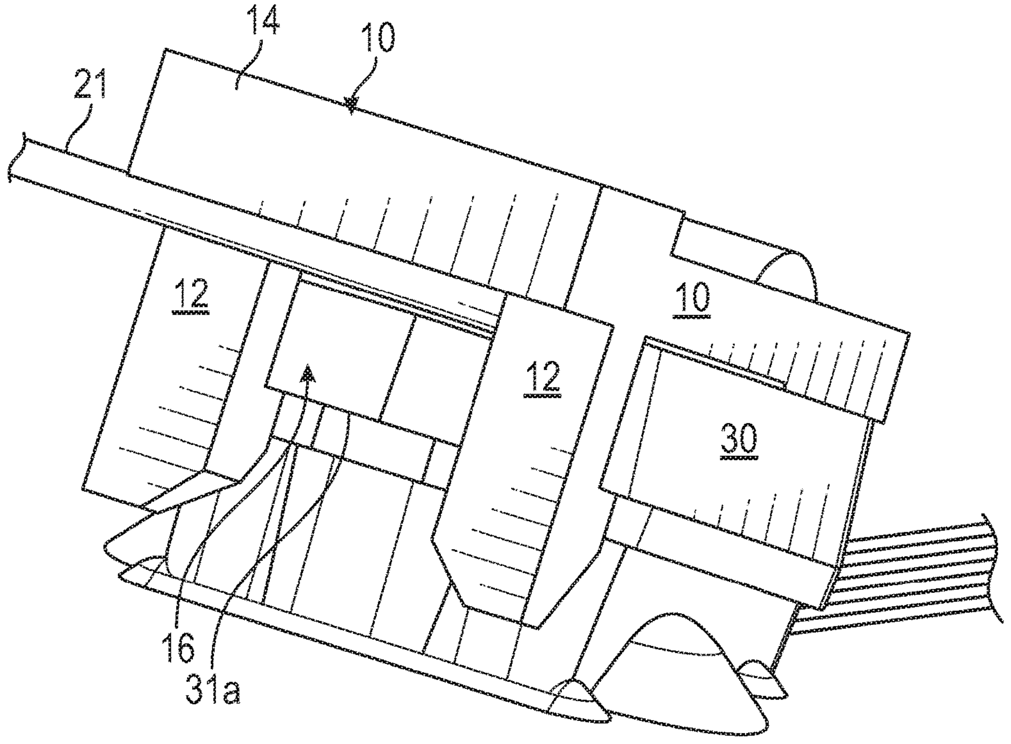
FIG. 3 is a rear perspective view of a covering latch configured to secure an optical ferrule received in an optical cradle, in accordance with an embodiment of the present description.

Additional views of covering latch 10 in various configurations are provided in the remaining figures of this specification. For example, FIG. 3 provides a rear perspective view of covering latch 10 in the latched position with optical cradle 30. Rear arms 12 are shown engaged with a rear latching surface 31*a* of optical cradle 30. In some embodiments, rear arms 12 are spaced-apart and define an opening 16 therebetween for receiving optical waveguide 21 attached to optical ferrule 20 (optical ferrule 20 is seated in optical cradle 30 and covered by covering latch and is therefore not visible in FIG. 3). In some embodiments, optical waveguide 21 may be one or more optical fibers, or a ribbon cable containing one or more optical fibers.

Figure 4:
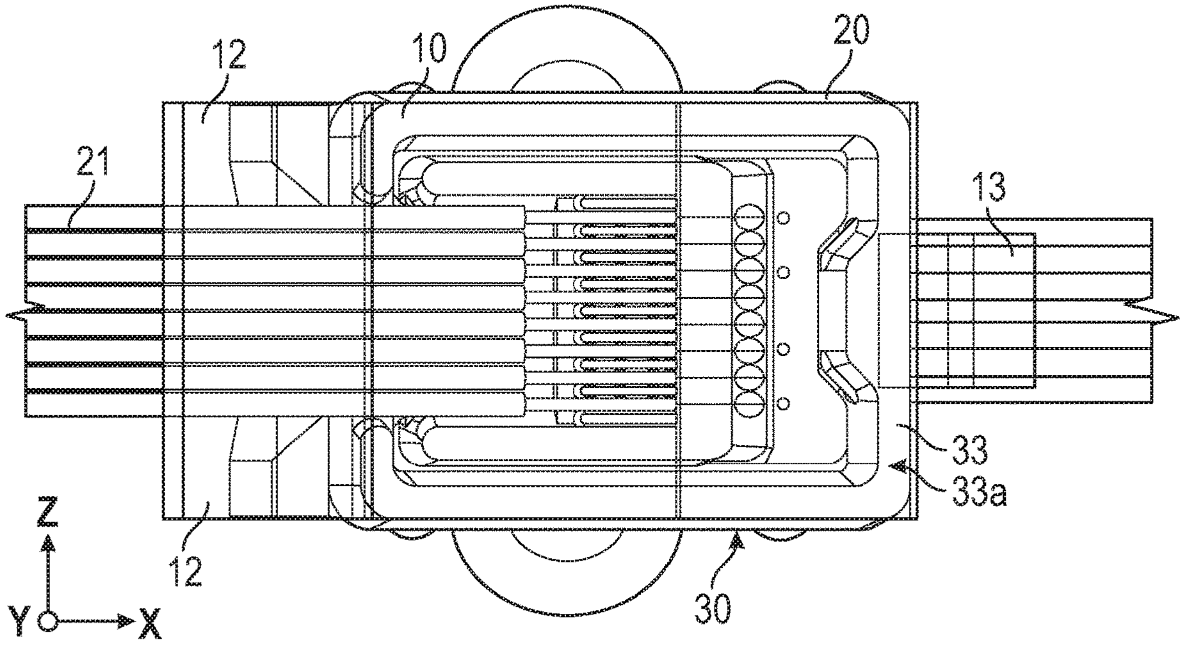
FIG. 4 is a top, see-through view of a covering latch configured to secure an optical ferrule received in an optical cradle, in accordance with an embodiment of the present description.

FIG. 4 is a top, see-through view of covering latch 10 of the previous figures, showing the optical ferrule 20 seated inside opening 33*a* in top major surface 33 of optical cradle 30. Covering latch 10 is shown as semi-transparent to allow items that are covered by covering latch 10 to be visible for discussion purposes. Covering latch 10 is shown in a fully latched position in a top, plan view (please note the x-axis and y-axis shown in FIG. 4). Elastic front arm 13 and rear arms 12 are in position and engaged with optical cradle 30, and rear arms 12 are disposed on either side of optical waveguide 21 (e.g., a ribbon cable of optical fibers), allowing it to pass therebetween and connect to optical ferrule 20.

Figure 5:
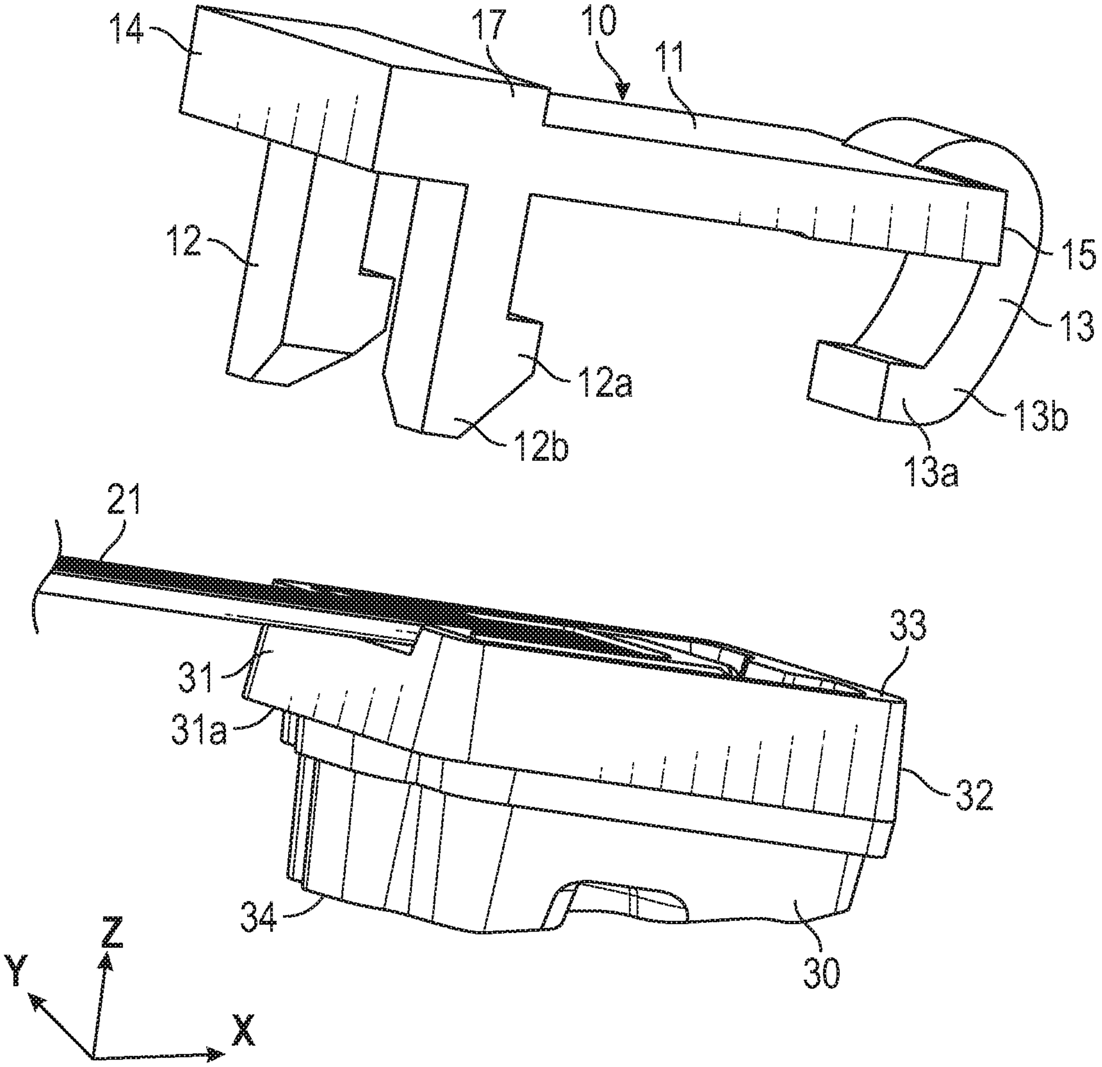
FIG. 5 is an exploded view of a covering latch and optical cradle/optical ferrule assembly, in accordance with an embodiment of the present description.

FIG. 5 is an exploded view (i.e., latch separated from cradle) of a covering latch 10 and optical cradle 30 and optical ferrule 20 assembly, showing additional details on the covering latch and the optical cradle 30 features. In some embodiments, covering latch 10 includes a cover portion 11 (i.e., intended to substantially cover and hold in alignment the optical ferrule 20) disposed between a rear end 14 and a front end 15. In some embodiments, covering latch 10 includes a pair of rear arms 12 extending downwardly from rear end 14. In some embodiments, at least one of the rear arms 12 includes a rear latch hook 12*a* disposed proximate a free end 12*b* of the rear arm 12 for engaging a rear latching surface 31*a* defined in the rear side 31 of the optical cradle 30. In some embodiments, the rear latching surface 31*a* may be spaced apart from top major surface 33 and bottom major surfaces 34 of optical cradle 30 along a thickness direction (i.e., in the z-axis shown in FIG. 5) of optical cradle 30 (i.e., rear latching surface 31*a* may be disposed between top major surface 33 and bottom major surface 34). In some embodiments, the rear latching surface may face bottom major surface 34, and away from the top major surface 33. In some embodiments, covering latch 10 may further include an elastic front arm 13 extending downwardly from front end 15.

Figure 6:
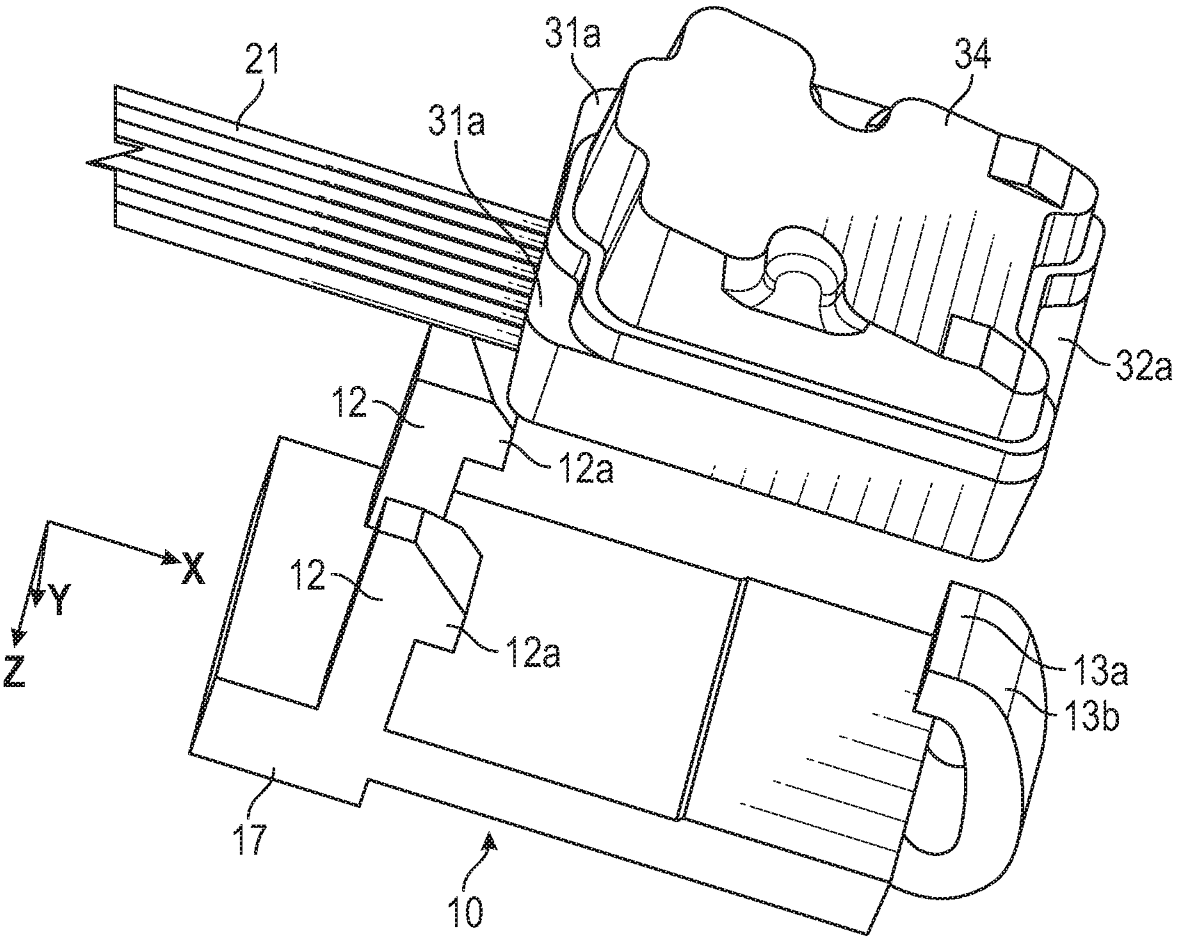
FIG. 6 is a bottom exploded view of a covering latch and optical cradle/optical ferrule assembly, in accordance with an embodiment of the present description.

Additional detail will be provided on the features of elastic front arm 13 in the discussion of FIG. 6, showing a bottom perspective view of the exploded assembly of FIG. 5. In some embodiments of the covering latch 10, the elastic front arm 13 may include a front latch hook 13*a* disposed proximate a free end 13*b* (i.e., an end hanging free and not connected to covering latch 10) of the elastic front arm 13 for engaging a front latching surface 32*a* defined in the front side of optical cradle 30. FIG. 6 provides a better view of rear latching surface 31*a*, which may include two separate latching areas, as shown in FIG. 6 (i.e., one latching surface for each of rear latch hooks 12*a* of rear arms 12). In some embodiments, the front latching surface 32*a* may be spaced apart from top 33 and bottom 34 major surfaces of optical cradle 30 along a thickness direction (e.g., the z-axis shown in FIG. 6) of optical cradle 30. In some embodiments, the front latching surface 32*a* faces the bottom major surface 34, and away from the top major surface 33 (see top major surface 33 in FIG. 5).

Figure 7A:
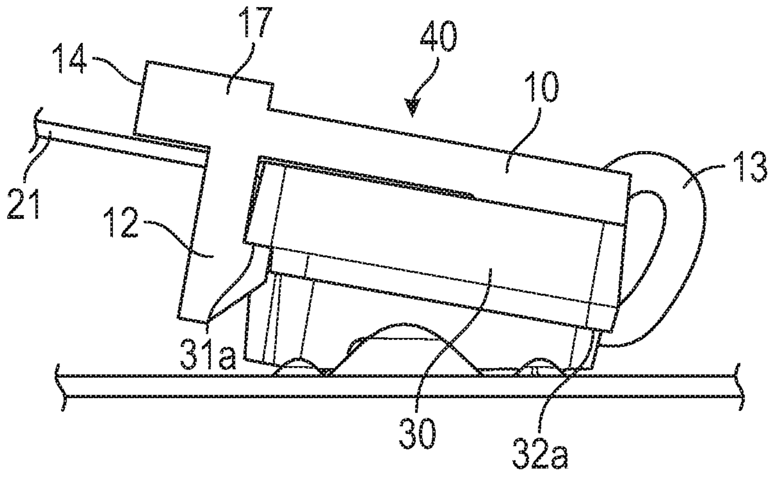
FIGS. 7A and 7B are side views of a covering latch securing an optical ferrule received in an optical cradle in a latched position, in accordance with an embodiment of the present description.

FIGS. 7A through 9B the covering latch 10 in various positions, including latched, flexed, and unlatched. FIGS. 7A and 7B show essentially the same elements in the same configuration (i.e., in the fully latched position 40), with the difference that FIG. 7B is a cut-away view which shows optical ferrule 20 resting inside optical cradle 30, while FIG. 7A is a view of the latched assembly without the cut-away view. FIGS. 7A and 7B should be viewed together for the following discussion.

Figure 7B:
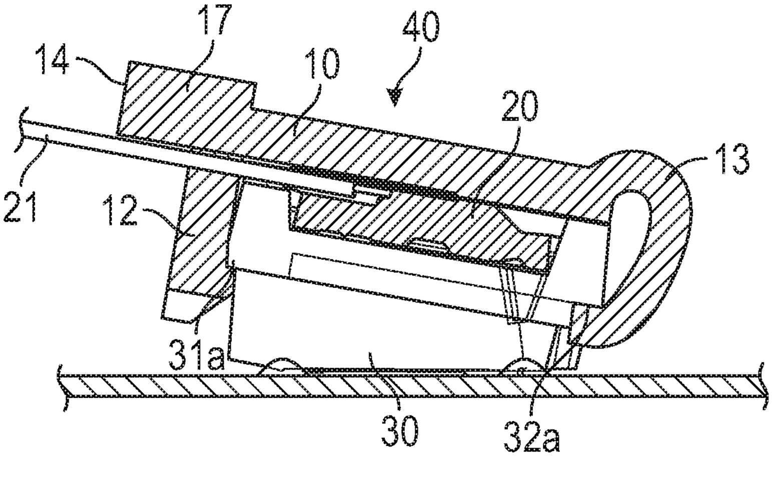

In the fully latched position 40 of FIGS. 7A and 7B, rear arms 12 engage rear latching surface 31*a* and elastic front arm engages front latching surface 32*a*. In this latched configuration, the optical ferrule 20 is held in alignment with the optical cradle and remains secure when an external force (e.g., an inadvertent pulling force caused from handling) is applied to optical waveguide 21 attached to optical ferrule 20.

Figure 8A:
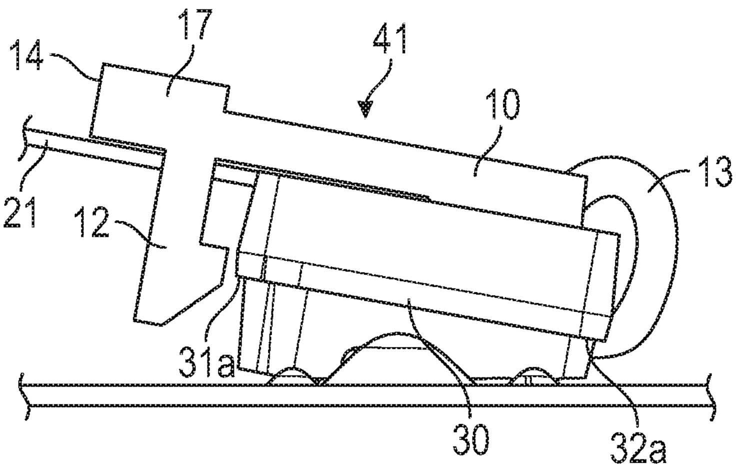
FIGS. 8A and 8B are side views of a covering latch securing an optical ferrule received in an optical cradle in a flexed position, in accordance with an embodiment of the present description.
Figure 8B:
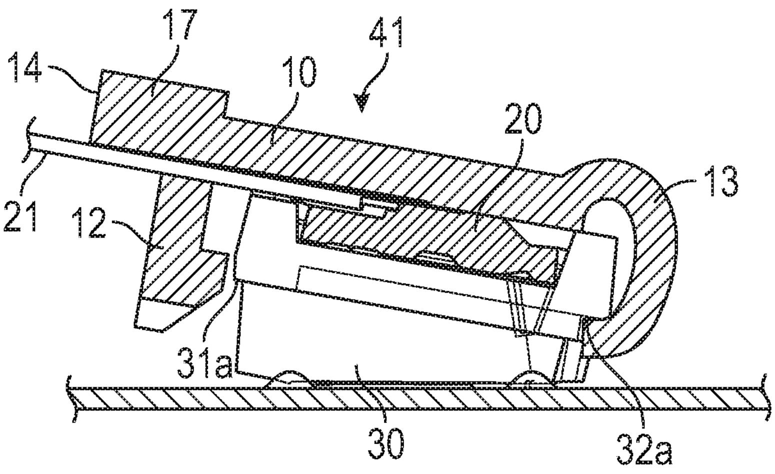

FIGS. 8A and 8B show essentially the same elements in the same configuration (i.e., in the flexed position 41), with the difference that FIG. 8B is a cut-away view which shows optical ferrule 20 resting inside optical cradle 30, while FIG. 8A is a view of the flexed assembly without the cut-away view. FIGS. 8A and 8B should be viewed together for the following discussion. The "flexed" position 41 is when the covering latch 10 is starting to be removed from optical cradle 30, when the covering latch 10 is pulled rearwardly (e.g., someone grasps pulling portions 17 of covering latch 10 and begins to pull it toward rear end 14, flexing elastic front arm 13 enough so that rear arms 12 disengage from rear latching surface 31*a*).

Figure 9A:
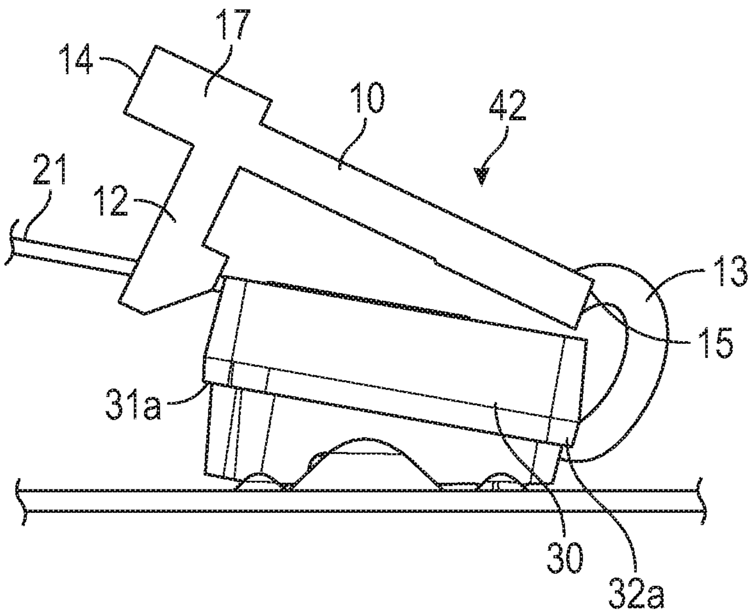
FIGS. 9A and 9B are side views of a covering latch securing an optical ferrule received in an optical cradle in an unlatched position, in accordance with an embodiment of the present description.
Figure 9B:
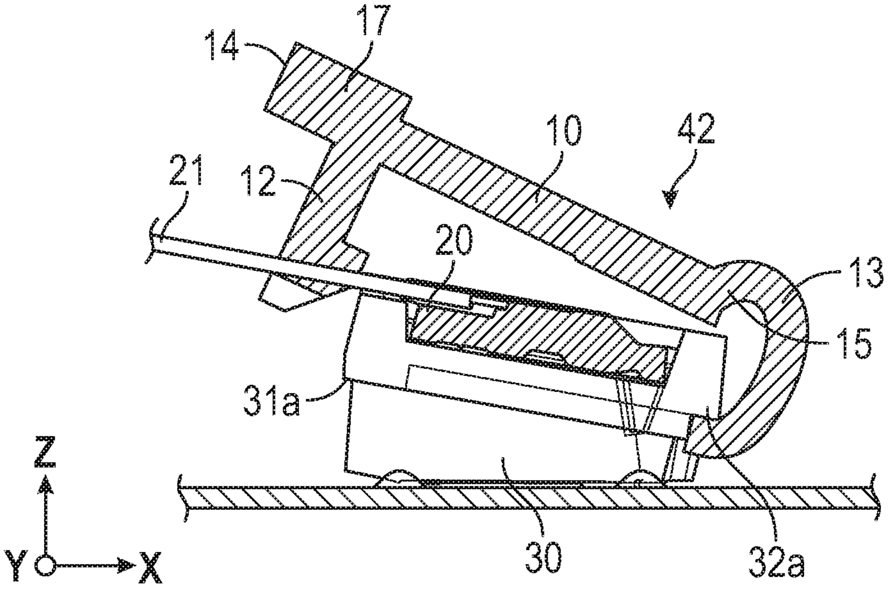

FIGS. 9A and 9B show essentially the same elements in the same configuration (i.e., in the unlatched position 42), with the difference that FIG. 9B is a cut-away view which shows optical ferrule 20 resting inside optical cradle 30, while FIG. 9A is a view of the unlatched assembly without the cut-away view. FIGS. 9A and 9B should be viewed together for the following discussion. In the "unlatched" position 42, after covering latch 10 has been pulled rearwardly (e.g., into the "flexed" position 41), the covering latch 10 is rotated about a lateral axis (e.g., parallel to the y-axis as shown in FIG. 9B) substantially orthogonal to the length direction (e.g., the x-axis) and disposed near the front arm 13 of covering latch 10. This rotation may be done until rear arms 12 disengage completely from cradle 30, as shown in FIGS. 9A and 9B. The covering latch 10 may then be removed by moving it slightly forward (not shown) to disengage front arm 13 from the cradle 30.

Figure 10:
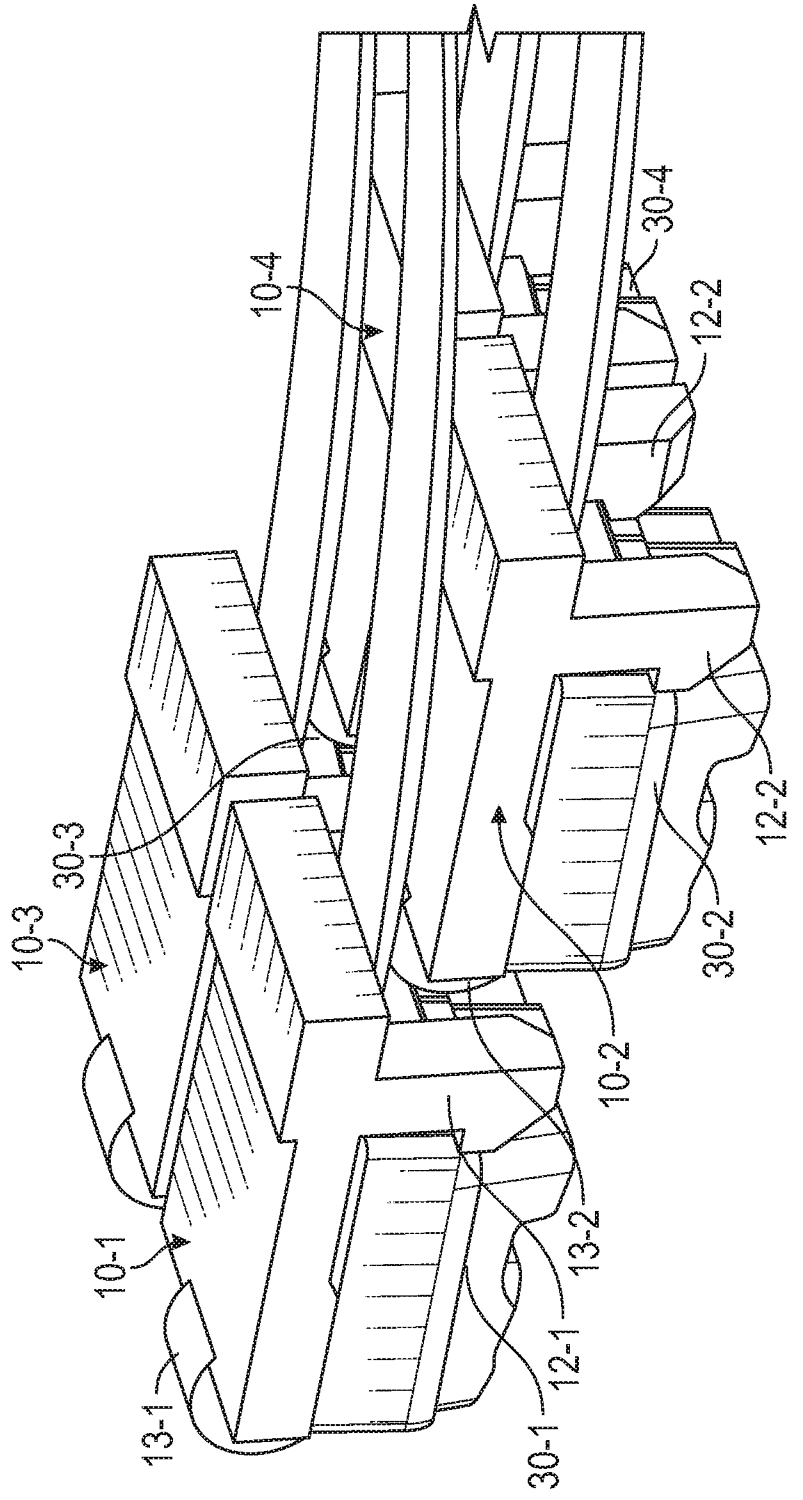
FIG. 10 is an illustration showing how multiple covering latches can be packed closely together, in accordance with an embodiment of the present description.
Figure 11A:
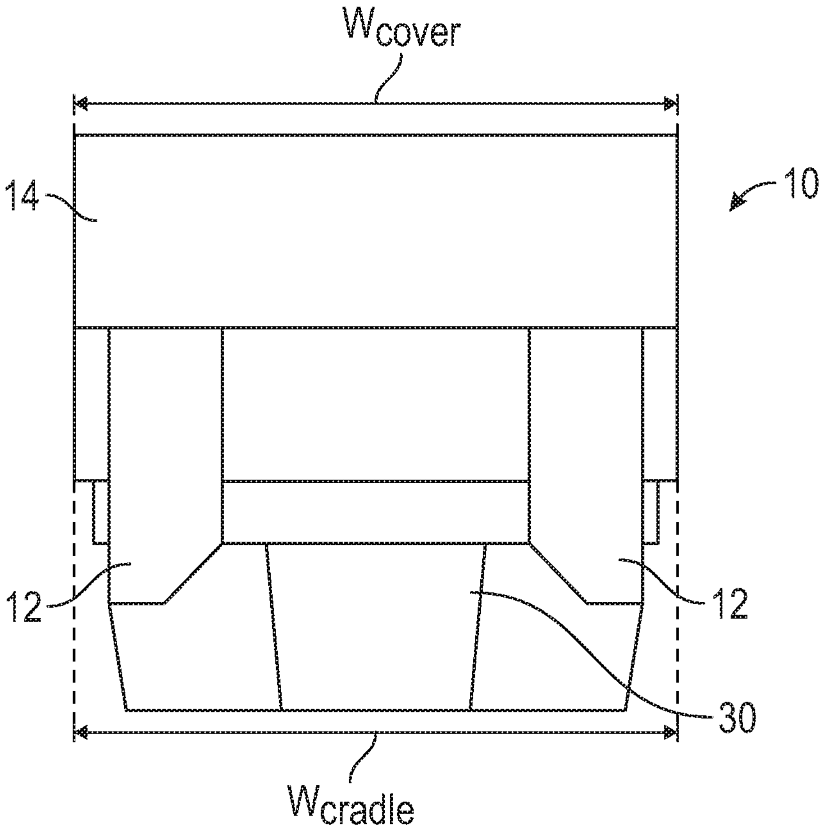
FIGS. 11A and 11B show additional details on the dimensions of the covering latch that allow it to be packed closely with additional covering latches, in accordance with an embodiment of the present description.
Figure 11B:
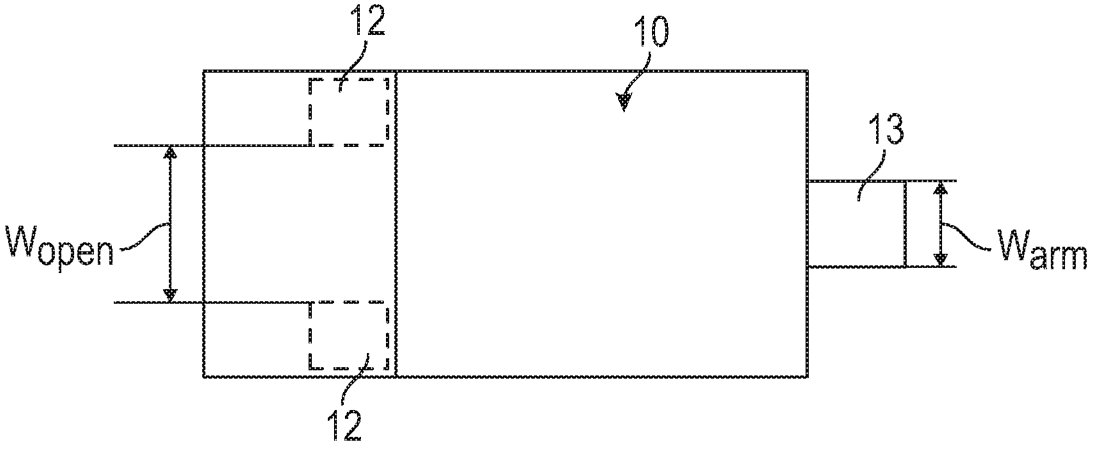

FIGS. 10 and 11A-11B provide illustrations showing how multiple covering latches can be configured such that they can be packed closely together. FIG. 10 shows four separate covering latches 10-1, 10-2, 10-3, and 10-4 in a locked configuration over corresponding optical cradles 30-1, 30-1, 30-3, and 30-4. In some embodiments, the cradles 30 may be packed close together in this fashion because of configuration features as shown in FIGS. 11A and 11B. For example, FIG. 11A shows a rear view of a covering latch 10 in place on an optical cradle 30. In some embodiments, the width $W_{cover}$ of the covering latch 10 is such that it is approximately equal to the width $W_{cradle}$ of optical cradle 30, or is less than the width $W_{cradle}$ of optical cradle 30, or is not significantly wider than $W_{cradle}$ of optical cradle 30. As the width $W_{cover}$ of covering latch 10 is not significantly wider than $W_{cradle}$ of optical cradle 30 (and may be equal to or even less than the width $W_{cradle}$ of optical cradle 30), multiple cradles 30 can be packed side-by-side, such as cradle 30-1 with covering latch 10-1 and cradle 30-3 with covering latch 10-3 shown in FIG. 10.

FIG. 11B shows that a width $W_{arm}$ of the elastic front arm 13 of covering latch 10 is, in some embodiments, configured to be less than the width $W_{open}$ defined between rear arms 12. In such embodiments, this allows the covering latch (e.g., covering latch 10-1 in FIG. 10) to be placed end-to-end closely with another covering latch (e.g., covering latch 10-2). That is, even when disposed in close proximity to each other as shown in FIG. 10, the rear arms 12-1 of covering latch 10-1 may be pulled rearwardly (i.e., toward covering latch 10-2) without rear arms 12-1 interfering with the elastic front arm 13-2 of covering latch 10-2.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description. "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description. "substantially equal" will mean about equal where about is as described above. If the use of "substantially parallel" is not otherwise clear to one of ordinary skill in the art in the context in which it is used and described in the present description. "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description. "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. A covering latch configured to secure an optical ferrule received in an optical cradle, the covering latch comprising a cover portion configured to extend across and cover at least a portion of the optical ferrule, a pair of rear arms and an opposing elastic front arm extending downwardly from proximate respective rear and front ends of the cover portion for engaging respective rear and front sides of the optical cradle, the pair of rear arms defining an opening therebetween for receiving an optical waveguide attached to the optical ferrule, such that pulling the cover portion rearwardly, causes the elastic front arm to flex, and the rear arms to disengage from the rear side of the optical cradle.

2. The covering latch of claim 1, wherein from a top plan view of the covering latch, the covering latch extends across and covers at least 30% of the optical ferrule.

3. The covering latch of claim 1, wherein at least one of the rear arms in the pair of rear arms comprises a rear latch hook disposed proximate a free end of the rear arm for engaging a rear latching surface defined in the rear side of the optical cradle.

4. The covering latch of claim 3, wherein the rear latching surface is spaced apart from top and bottom major surfaces of the optical cradle along a thickness direction of the optical cradle, the top major surface defining an opening therein for receiving the optical cradle.

5. The covering latch of claim 4, wherein the rear latching surface faces the bottom, and away from the top, major surface.

6. The covering latch of claim 1, wherein the elastic front arm comprises a front latch hook disposed proximate a free end of the front arm for engaging a front latching surface defined in the front side of the optical cradle.

7. The covering latch of claim 6, wherein the front latching surface is spaced apart from top and bottom major surfaces of the optical cradle along a thickness direction of the optical cradle, the top major surface defining an opening therein for receiving the optical cradle.

8. The covering latch of claim 7, wherein the front latching surface faces the bottom, and away from the top, major surface.

9. The covering latch of claim 1, wherein the elastic front arm is substantially more elastically flexible than each of the pair of rear arms.

10. The covering latch of claim 1, wherein the elastic front arm is generally C-shaped and each of the pair of rear arms is generally L-shaped.

11. The covering latch of claim 1, wherein a width of the covering latch as seen from the rear side of the covering latch is not significantly wider than a width of the optical cradle.

12. The covering latch of claim 1, wherein a width of the elastic front arm as seen in a top plan view of the covering latch is less than a width of the opening defined between the pair of rear arms.

13. The covering latch of claim 1 further comprising a pull portion extending from the cover portion and configured to be pulled rearwardly to cause the elastic front arm to flex and the rear arms to disengage from the rear side of the optical cradle.

14. A unitary covering latch configured to be removably assembled to an optical cradle configured to align to an optical ferrule and comprising a middle portion, at least one rear-engaging feature and at least one front-engaging feature spaced apart along a length direction of the covering latch and disposed at respective rear and front sides of the covering latch, such that when the unitary covering latch is removably assembled to the optical cradle aligned to the optical ferrule:

the middle portion covers at least a portion of the optical ferrule;

the at least one rear-engaging feature engages a rear side of the optical cradle; and the at least one front-engaging feature engages a front side of the optical cradle;

wherein, the covering latch secures the optical ferrule aligned to the optical cradle; and wherein, the unitary covering latch is removed from the optical cradle by first pulling the unitary covering latch rearwardly along the length direction followed by rotating the unitary covering latch about a lateral axis substantially orthogonal to the length direction and disposed near the front-engaging feature of the covering latch.

15. The unitary covering latch of claim 14, wherein the optical ferrule aligned to the optical cradle remains secure when an external force acts on an optical waveguide attached to the optical ferrule.

16. The unitary covering latch of claim 14, wherein the at least one rear-engaging feature comprises a rear latch hook disposed proximate a free end of the at least one rear-engaging feature for engaging a rear latching surface defined in the rear side of the optical cradle.

17. The unitary covering latch of claim 16, wherein the rear latching surface is spaced apart from top and bottom major surfaces of the optical cradle along a thickness direction of the optical cradle, the top major surface defining an opening therein for receiving the optical ferrule.

18. The unitary covering latch of claim 14, wherein the at least one front-engaging feature comprises a front latch hook disposed proximate a free end of the at least one front-engaging feature for engaging a front latching surface defined in the front side of the optical cradle.

19. The unitary covering latch of claim 18, wherein the front latching surface is spaced apart from top and bottom major surfaces of the optical cradle along a thickness direction of the optical cradle, the top major surface defining an opening therein for receiving the optical ferrule.

20. The unitary covering latch of claim 14, wherein the at least one front-engaging feature is substantially more elastically flexible than the at least one rear-engaging feature.

* * * * *